United States Patent [19]

Harrier

[11] 3,715,233

[45] Feb. 6, 1973

[54] PROCESS FOR PREPARING FIBERGLASS PREFORMS

[75] Inventor: Jack L. Harrier, Lansing, Ill.

[73] Assignee: Standard Oil Company, Chicago, Ill.

[22] Filed: Sept. 18, 1970

[21] Appl. No.: 73,663

[52] U.S. Cl. ......117/126 GB, 117/161 K, 260/75 M, 260/75 R
[51] Int. Cl. .............................................B32b 17/04
[58] Field of Search ......260/75 M, 75 R; 17/126 GB, 17/161 K

[56] References Cited

UNITED STATES PATENTS

| | | | |
|---|---|---|---|
| 3,223,666 | 12/1965 | Bolton | 117/128.4 |
| 2,855,373 | 10/1958 | Guenther | 117/126 GB |
| 3,067,179 | 12/1962 | Frey | 260/75 M |
| 3,355,408 | 11/1967 | Mayer et al. | 260/75 M |

Primary Examiner—William D. Martin
Assistant Examiner—D. Cohen
Attorney—Arthur G. Gilkes, William T. McClain and Ralph C. Medhurst

[57] ABSTRACT

An improved process for the preparation of a polyester resin that can be solubilized in water as formed, and, when partially cured is insoluble in, but permeable to, polymerizable monomers such as styrene which comprises admixing a mixture of polycarboxyl-affording substances with a polyhydroxyl-affording substance and heating the mixture in the temperature range of 300°–450°F. until a thin sample of the material cures at 392°F. in from about 10 to about 40 seconds. The method of binding glass fibers into a mass suitable for reinforced-fiber molding purposes which comprises the steps of treating fibrous glass with the resin solubilized in water to form a resin-fiberglass composite and partially curing said composite at a temperature above about 200°F. until a water-insoluble, styrene-insoluble but styrene permeable composite is formed.

12 Claims, No Drawings

PROCESS FOR PREPARING FIBERGLASS PREFORMS

BACKGROUND OF THE INVENTION

The majority of reinforced plastic items utilize glass fibers as the reinforcement material. In certain applications, the fibers are gathered into the shape of the article to be made and treated with a binder which insures that this preform will retain its shape during storage and/or the subsequent molding operation. Numerous binders are available to make these fiberglass preforms, but they all suffer from one or more of the following disadvantages:
1. The binder produces off-white preforms because of resin-darkening during curing.
2. The binder produces preforms which crumble on storage.
3. The binder partially dissolves in the styrene loosening the fibers during the molding process.
4. The binder is a thermosetting resin which easily clogs the spray-gun used in a popular manner of resin application.
5. The binder coats the individual glass fibers with a thin, impermeable coating so that the styrene utilized in molding does not chemically bond directly to the fibers.

Now it has been discovered that by varying the reaction conditions to give a polyester resin with the correct degree of cross-linking and hence molecular weight, these disadvantages may be eliminated and a superior binder formed.

SUMMARY OF THE INVENTION

This invention relates to a process for making polyester resins of improved properties and a method of using them as binders in resin-fiberglass preforms. More particularly, it has been found that polyester resins made by heating mixtures of polycarboxyl-affording compounds with a polyhydroxyl-affording compound close to the gellation point produce resin-fiberglass preforms of remarkably improved properties when the fiberglass and the water-solubilized resin are admixed and the composite partially cured thermally.

STATEMENT OF THE INVENTION

The novel combination of polymerizable-monomer-permeability plus polymerizable-monomer-insolubility with the water-solublizable polyester resin herein described is the result of a process improvement resulting from the discovery that the extent of polyesterification is a critical parameter. The extent of the polyesterification reaction is monitored by removing resin samples from the reaction vessel and measuring their cure times. The shorter the cure time the less soluble is the resin in the polymerizable monomer used for molding. Thus, by heating the reaction mixture to a shorter cure time than previously has been the case, the resin of this invention has a higher degree of cross-linking and is substantially insoluble in, but substantially permeable to, molding monomer. By substantially insoluble is meant resinous preforms which, after soaking in styrene for several weeks at room temperature, show no fiber release and which show little or no glass wash in press molding applications. By substantially permeable is meant resinous preforms which, after a short soaking in styrene, are transparent.

In other applications wherein similar compositions have been used, c.f. U.S. Pat. Nos. 3,223,666; 3,355,408 and 3,070,256, cure times are about 60 seconds or higher and the resins produced thereby are too soluble in styrene for good results. In the instant improved process, reaction time and reaction temperature are adjusted so that the resin is heated close to the gellation point during preparation. If reaction continues too long, cure times of less than about 10 seconds, gellation occurs in the reaction vessel. If the reaction time is too short, cure times of greater than about 40 seconds, the resin is partially soluble in the molding monomer.

As can be appreciated this cure time test is empirical and another test temperature, cure time range and sample size combination may be used and the same resin and properties will be produced. The cure time test involves removing a drop (about 0.02 milliliter) of the polyester resin from the reaction vessel with a metal stylus and rapidly smearing the drop on a hot shiny metal surface held at 392°F. with the stylus. The point of solidification is measured in seconds with a stopwatch and is readily felt as the stylus smears the resin on the hot surface. Hot plates specifically designed for this purpose may be obtained from the Thermoelectric Company with a description of the test. Using this test it has been found that a cure time of about 10 to about 40 seconds at 392°F., preferably about 20 to about 30 seconds, gives a resin which has the requisite styrene permeability and insolubility. When the resin has a cure time at 392°F. within the broader range given above the acid number of the material will be about 30 to about 120.

In press molding operations where rapid press closure causes resin surging, fibers are torn or washed out of the preforms made from resins which are soluble or partially soluble in the polymerizable monomer being used. In the past to obtain the required polymerizable-monomer-insolubility thermosetting resins were used for the preforms in these molding applications, but such resins cure totally during the production of the preforms and are impermeable to styrene monomer. With these systems it is common to have hard impermeable resin regions on the glass fibers which cause weak spots in the final laminates.

The improved process described herein utilizes in one of its embodiments, a benzene triacarboxyl-affording reactant (trimellitic acid or the anhydride thereof) a saturated or mono-olefinic, dicarboxyl-affording reactant such as adipic acid or succinic acid or such as maleic acid or fumaric acid, preferably adipic acid or maleic acid or the anhydrides thereof, a benzene dicarboxylic acid-affording reactant such as an isomer of phenylene dicarboxylic acid, preferably isophthalic acid, and a polyfunctional hydroxyl-affording reagent such as a lower alkyl triol or a $C_{2-6}$ glycol such as neopentylglycol, ethylene glycol, propylene glycol, diethylene glycol, dipropylene glycol, preferably propylene glycol. By lower alkyl is meant a material containing three to about six carbon atoms. It will be appreciated by one skilled in the art that a mixture of these polyhydroxyl-affording substances may be used also. Generally, the benzene tricarboxyl- and saturated or mono-olefinic dicarboxyl-affording reactants are present in a mole ratio of about 3 to 1 to 1 to 3, preferably 2 to 1 to 1 to 2, and, most preferably, about

1.2 to 1 to about 0.8 to 1. The mole ratio of the benzene dicarboxyl,affording reactant to the benzene tricarboxyl-affording reactant runs from about 0 to 1 to about 2 to 1, most preferably about 0.8 to 1 to about 1.2 to 1. The amount of the lower alkyl triol or $C_{2-6}$ glycol generally runs from about 105 to about 150 mole percent of the amount required to react with the carboxyl groups of the carboxyl-affording reactants, preferably about 110 to about 130 mole percent and, most preferably, about 110 to about 120 mole percent.

In another embodiment the benzene dicarboxyl-affording reactant is absent and two polycarboxyl-affording reactants are used. These are the trimellitic acid reactant and the saturated or mono-olefinic dicarboxyl-affording reactant. In this embodiment the scope of the useful and preferred reactants are the same as in the embodiment previously described. The benzene tricarboxyl- and saturated or mono-olefinic dicarboxyl-affording reactants are present in a mole ratio of about 3 to 1 to about 1 to 3, most preferably about 3.3 to 2 to about 2.7 to 2, and the amount of the lower alkyl triol or $C_{2-6}$ glycol reactant generally runs from about 105 to 150 mole percent of the amount required to react with the carboxyl groups of the polycarboxyl-affording reactants, preferably about 110 to about 130 mole percent, and, most preferably about 120 to about 125 mole percent.

In all of the embodiments of this invention reaction is accomplished by heating the reactants in such a way as to continually remove water produced during the polycondensation reaction as is well-known in the art. Heating is usefully carried out in the temperature range from about 300°F. to about 450°F. At the lower end of this temperature range reaction times are too long and at the upper end reaction proceeds so rapidly that it is difficult to stop the reaction such that the resultant polyester resin has a cure time at 392°F. in the critical range. Preferred reaction temperatures and times in both embodiments run from about 350°F. to about 425°F. for from about 8–16 hours. Time and temperature are, as can be appreciated, interdependent and the above ranges are representative only. The extent of the polyesterification, a critical feature of this invention, is controlled by monitoring the cure time which should be about 10 to about 40 seconds, preferably about 20 to about 30 seconds with the test described above.

In the preferred embodiment of the improved process the heating step is advantageously carried out in two stages. In the first stage the polycarboxyl-affording reactants, except for the trimellitic acid anhydride reactant, and the polyfunctional hydroxyl-affording reactant are admixed and heated to from about 300°–450°F. until an acid number (milligrams KOH per gram of polyester) of about 5 to about 15 is obtained. The trimellitic acid anhydride reactant is then added and the heating continued until a thin sample of the polyester cures, when smeared on a surface heated to 392°F. in a time of from about 20 seconds to about 30 seconds.

The reaction is generally carried out using a slow stream (about 0.1 to about 2 cubic feet per hour) of a gas which is substantially inert to the reaction product at reaction temperature such as nitrogen or carbon dioxide. The passage of this gas aids in the removal of the water formed during the esterification reaction.

Generally, the improved polyester resin is used in the manufacture of preforms in the form of a solution. Water is the preferred solvent but other organic and inorganic solvents such as ketones, esters and amines are usable. In water solutions basic substances are necessarily dissolved to solubilize these resins. These basic substances are normally organic alkyl, aryl or alkaryl amines such as methyl-, dimethyl-, ethyl-, or propylamine, phenylmethylamine, quinoline, and the like. Preferably the solubilizer is triethylamine. The criteria for choosing a solubilizer are that it be sufficiently basic to take the resin into water solution and that it be volatile enough to evaporate easily during the partial heat curing of the coated fibrous glass.

Care must be exercised during solubilization of these polyester resins since the resins have relatively high flow points (about 250°F. –350°F.), whereas the amines which are generally used in solubilizing the resins in water have boiling points of about 193°F. to 250°F.

The concentration of resin in the water solution depends upon the particular application and means used to apply the resins to the fiberglass. Obviously, solution containing about the solubility limit of resins tend to be too viscous for use while very dilute solutions deposit too little resin. A range of about 2 to about 20 weight percent of resin in water is useful, and preferably, a solution of about 5 to about 8 percent by weight of resin is used.

Partial curing of the preform is carried out by heating resin coated fibrous-glass until it is water-insoluble, a styrene-insoluble and styrene-permeable. The particular temperature at which the curing produces a preform having this proper water-insolubility, styrene-insolubility and styrene-permeability depends upon the chemical nature of the resin. In the embodiment above described wherein three poly-carboxyl-affording reagents are used, the preform may be cured in the temperature range above about 300°F., preferably, from about 400°F. to about 600°F. and most preferably from about 450°F. to about 550°F. In the embodiment above described wherein only two polycarboxyl-affording reagents are used, curing is usefully carried out above 200°F., preferably from about 300°F. to about 500°F. and most preferably from about 350°F. to about 450°F.

In the most preferred temperature range the partial curing of the preform is accomplished in about 30 to about 60 seconds. As can be appreciated cure time of the preform is temperature dependent and at any cure temperature the cure time is dictated by the minimum time required to give a preform having the properties of monomer-insolubility and monomer-permeability.

Normally, a short preliminary drying at about 100°F. to 150°F. is carried out after the resin solution is applied which serves to remove the solvent and make the preform tack-free and handleable. After this preliminary heating, the resin component of the preform is still water-soluble.

Advantage of the water solubility of the uncured but dry resin is utilized in an alternate method of resin application to fibrous glass material. Preforms of the same quality as above described can be made by wetting unsized glass roving with a water solution of resin and drying the roving for a few hours at about 100°F. The roving is then cut into 1 inch lengths, distributed over the surface of a shape of the appropriate configuration, and the distributed roving is then sprayed with water and cured in a forced-draft oven at 550°F. for a short time.

Some properties of fiberglass preforms suitable for preparing molded laminates and made with the resins described in the Examples, are shown in Table I.

TABLE I

FIBERGLASS PREFORM PROPERTIES

| PROPERTY | COMMENT |
|---|---|
| 1. Color | 1. Very light. |
| 2. Resin Distribution on the Preform | 2. No obvious resin-rich areas or non-wetted areas. |
| 3. Styrene Solubility | 3. No solubility after soaking for several weeks. |
| 4. Preform Appearance | 4. Little fiberglass prominance. |
| 5. Water Solubility | 5. No solubility after soaking for several weeks. |
| 6. Styrene Permeability | 6. Strong bond to the fiberglass by polymerized styrene. |

It is within the contemplation of this invention that the novel polyester resin described herein may be used in applications other than binding masses of glass fibers such as the glass sizing or glass mat production areas.

EXAMPLE I

A 445.8 gram sample of propylene glycol, a 143.3 gram sample of maleic anhydride and a 243.3 gram sample of isophthalic acid (mole ratio of 4:1:1) were added to a reaction vessel fitted with an air-cooled condenser. A stream of nitrogen gas at a sparge rate of about 0.5 to 1 cubic foot per hour was initiated and continued throughout the length of the reaction. The reaction temperature in the vessel was raised from room temperature to about 360°F. over 0.5 of an hour and then over the next 8 hours the reaction temperature was raised to 400°–410°F. At this point the reaction product had an acid number of about 8 and about 67 milliliters of water distillate had been collected. A 281.7 gram sample of trimellitic acid anhydride was then added and the reaction temperature decreased over two hours to about 375°F. At this point the cure time of the reaction product was 28 seconds at 392° F. and the heating was stopped. A 1,000 gram portion of polyester was produced and 114 grams of water had been collected from the exit stream.

EXAMPLE II

A 484.4 gram sample of propylene glycol and a 155.8 gram sample of maleic anhydride (mole ratio of 4:1) were added to a reaction vessel fitted with an air-cooled condenser. A stream of nitrogen gas at a sparge rate of about 0.5 to 1 cubic foot per hour was initiated and continued throughout the length of the reaction. The temperature of the reaction vessel was raised from room temperature to about 360°F. over a period of 0.5 of an hour and reaction continued over a period of 6 additional hours, during which the temperature was raised to about 380°–390°F. At this point the reaction product had an acid number of 9, and about 32 milliliters of water had been collected from the exit stream. A 457.5 gram sample of trimellitic acid anhydride was then added and the reaction vessel temperature lowered to about 360°F. over the next hour and 20 minutes. At this point the polyester product had a cure time of 26 seconds at 392'F., and about 97 grams of water had been collected. The heating was stopped and the contents removed yielding 1,097 grams of product.

EXAMPLES III AND IV

The above two Examples were repeated except that an equimolar amount of adipic acid was substituted for the maleic anhydride (Examples III and IV). Some properties for resins produced in these Examples are shown in Table II below.

EXAMPLES V–VIII

Several gallons of a solution of the resin of Example I were made by heating water to 160°F. and then adding the theoretical amount of triethylamine (based on the acid number of the resin to be used) to the water. Enough resin was added to make up a 7 percent by weight solution by slowly adding the resin (preheated to 300°F. to 350°F.) to the water while vigorously agitating the latter. If, after any resin addition, the initial turbidity did not disappear, additional small amounts of the amine were added until the solution cleared. After all the resin was added enough additional amine to give a solution with a pH between 7.0 and 7.5 was added.

Preforms were prepared from the above solution by spraying the solution made above and chopped glass roving onto a surface of the of the appropriate shape. The preform was then baked for 40 seconds at 550°F.

The same procedure was followed using the resin of Example II except that the preform was baked at 450°F.

The same procedure for making preforms was used for the resins prepared in Examples III and IV except that the preform made from Example III resin was baked at 550°F. and the preform made from Example IV resin was baked at 450°F.

EXAMPLE IX

As an alternative method for preparing a preform the following procedure was used. Glass roving was wet with a 5 percent solution of the resin of Example II and the roving dried at about 100°F. for about 4 hours. The dried roving was cut into 1 inch lengths and the distributed roving was then sprayed with water and cured in a forced-draft oven for 60 seconds at 450°F. This procedure results in a preform having substantially the same properties as those prepared in Examples V–VIII. See Table I.

EXAMPLE X

Laminates were produced from the preforms made in Examples V–VIII using the following procedure. A preform containing approximately 95 percent by weight of glass fibers and 5 percent by weight of polyester binder was placed in a heatable mold. A mixture containing 40 percent by weight styrene, 30 percent by weight polyester molding resin, 29 percent powdered clay and 1 percent by weight of di(p-t-butylbenzoyl) peroxide as a polymerization catalyst was introduced into the mold. The mold was heated at about 260°F. for about 2 minutes and the laminate then ejected.

To test the strength of attachment of the polystyrene to the glass fibers the laminate was boiled 6 hours in water. After this boiling process, visual examination of the laminate showed no fiber prominance which is indicative of fiber loosening due to waterwicking, i.e., water penetration between the polystyrene and glass fiber interface.

TABLE II

PHYSICAL PROPERTIES OF POLYESTER RESINS

| Example No. | Cure Time at 392°F. (seconds) | Acid Number |
|---|---|---|
| I | 28 | 57 |
| II | 26 | 87 |
| III | 12 | 49 |
| IV | 27 | 84 |

While my invention has been described in conjunction with specific examples, it is to be understood that these are for illustrative purposes only. Many alternatives, modifications, and variations will be apparent to those skilled in the art in light of the foregoing description, such alternatives, modifications and variations falling within the spirit and the scope of the appended claims.

Having thus described the invention, what is claimed is:

1. A process for binding glass fibers which comprises the steps of:
   1. preparing the polycondensation reaction product of:
      a. trimellitic acid or the anhydride thereof,
      b. a saturated or mono-olefinic, dicarboxyl-affording compound having 3-6 carbon atoms or its anhydride,
      c. a benzene dicarboxyl-affording compound, and
      d. a lower alkyl triol or a $C_{2-6}$ glycol of the group consisting of alkylene glycol, ether glycol or mixtures thereof;
   wherein (a) and (b) are present in a respective mole ratio of about 3 to 1 to about 1 to 3, wherein (c) is present in an amount of about 0 to 2 moles per mole of (a) and wherein the amount of (d) is about 105 to 150 mole percent of the amount required to react with the carboxyl groups of said (a), (b) and (c), said polycondensation reaction product having an acid number of about 30 to about 120, by heating said (a), (b), (c) and (d) at a temperature from about 300°F. to about 450°F. until a thin sample of said polyester resin cures, when smeared on a surface held at 392°F., in a time from about 10 seconds to about 40 seconds,
   2. applying said polycondensation reaction product to glass fibers, and
   3. heating the composite of step 2 to above 300°F. until said polycondensation reaction product is substantially styrene-permeable and substantially styrene-insoluble.
2. The process of claim 1 wherein (b) is adipic acid or the anhydride thereof or maleic acid or the anhydride thereof, (c) is isophthalic acid and (d) is propylene glycol.

3. The process of claim 2 wherein the mole ratio of said (b) to (a) is from about 0.8 to 1 to about 1.2 to 1, the mole ratio of said (c) to (a) is from 0.8 to 1 to about 1.2 to 1 and the amount of said (d) is about 110 to about 120 mole percent of the amount required to react with the carboxyl groups of said (a), (b) and (c).

4. The process of claim 3 wherein a water-solubilized mixture of the polycondensation reaction product prepared in step 1 and water is applied to glass fibers in step 2.

5. The process of claim 3 wherein said heating of said (a), (b), (c) and (d) in step 1 is accomplished by:
   i. heating a mixture of (b), (c) and (d) from about 300°F. to about 450°F. until an acid number of about 5 to about 15 is obtained,
   ii. admixing reactant (a) with the heated mixture of step (i), and
   iii. heating the resulting combination from about 300°F. to about 450°F. until a thin sample of the polyester resin cures, when smeared on a surface heated to 392°F., in a time of from about 20 seconds to about 30 seconds.

6. The process of claim 5 wherein a water-solubilized mixture of the polycondensation reaction product prepared in step 1 and water is applied to glass fibers in step 2.

7. A process for binding glass fibers which comprises the steps of:
   1. preparing the polycondensation reaction product of:
      a. trimellitic acid or the anhydride thereof,
      b. a saturated or mono-olefinic, dicarboxyl-affording compound having 3-6 carbon atoms or its anhydride, and
      c. a lower alkyl triol or a $C_{2-6}$ glycol of the group consisting of alkylene glycol, ether glycol or mixtures thereof;
   wherein (a) and (b) are present in a respective mole ratio of about 3 to 1 to about 1 to 3 and wherein the amount of (c) is about 105 to 150 mole percent of the amount required to react with the carboxyl groups of said (a) and (b), said polycondensation reaction product having an acid number of about 30 to about 120, by heating said (a), (b) and (c) at a temperature from about 300°F. to about 450°F. until a thin sample of said polyester resin cures, when smeared on a surface held at 392°F., in a time from about 10 seconds to about 40 seconds,
   2. applying said polycondensation reaction product to glass fibers, and
   3. heating the composite of step 2 to above 300°F. until said polycondensation reaction product is substantially styrene-permeable and substantially styrene-insoluble.

8. The process of claim 7 wherein said (b) is adipic acid or the anhydride thereof or maleic acid or the anhydride thereof and (c) is propylene glycol.

9. The process of claim 8 wherein the mole ratio of said (a) to said (b) is from about 3.3 to 2 to about 2.7 to 2 and the amount of said (c) is about 120 to about 125 mole percent of the amount required to react with the carboxyl groups of said (a) and (b).

10. The process of claim 9 wherein a water-solubilized mixture of the polycondensation reaction product prepared in step 1 and water is applied to glass fibers in step 2.

11. The process of claim 9 wherein said heating of said (b) and (c) in step 1 is accomplished by:
 i. heating a mixture of (b) and (c) from about 300°F. to about 450°F. until an acid number of about 5 to 15 is obtained,
 ii. admixing reactant (a) with the heated mixture of step (i), and
 iii. heating the resulting combination from about 300°F. to about 450°F. until a thin sample of the polyester resin cures, when smeared on a surface heated to 392°F., in a time of from about 20 seconds to about 30 seconds.

12. The process of claim 11 wherein a water-solubilized mixture of the polycondensation reaction product prepared in step 1 and water is applied to glass fibers in step 2.

* * * * *